United States Patent [19]

Slater et al.

[11] 4,401,100
[45] Aug. 30, 1983

[54] WATER HEATING SYSTEM

[76] Inventors: Harold E. Slater, 12822 Beechtree, Lakeside, Calif. 92040; Thomas R. Alspaugh, 4707 Otomi Ave., San Diego, Calif. 92117

[21] Appl. No.: 259,988

[22] Filed: May 4, 1981

[51] Int. Cl.³ .............................. F24H 1/00; F24J 3/02
[52] U.S. Cl. .................................. 126/362; 126/435; 237/59; 137/113
[58] Field of Search ............... 126/362, 344, 101, 435, 126/434, 437, 121, 132; 219/310, 314, 323, 325; 122/234, 239, 406 R, 408 R; 165/104.19, 108, 138, 163; 237/8 A, 59, 56, 61, 62; 137/112, 113

[56] References Cited

U.S. PATENT DOCUMENTS

| | | | |
|---|---|---|---|
| 923,025 | 5/1909 | Curran | 126/362 X |
| 1,425,174 | 8/1922 | Cartter | 126/434 |
| 1,643,223 | 9/1927 | O'Dowd | 126/362 X |
| 2,246,802 | 6/1941 | Kehm et al. | 237/59 |
| 4,273,102 | 6/1981 | Anthony | 126/435 |

*Primary Examiner*—Samuel Scott
*Assistant Examiner*—Randall L. Green
*Attorney, Agent, or Firm*—Charles C. Logan, II

[57] ABSTRACT

A water heating system comprises a lower energy storage tank connected with a source of energy and an upper tank mounted on top of the lower. The upper tank may be a conventional water heater or a water storage tank connected at an outlet therefrom with an instantaneous type water heater, and the tanks are interconnected through a valve. The valve operates to direct incoming cold water through a heat exchanger in the lower tank for being preheated prior to introduction into the upper tank and accommodates a thermal syphon effect between the tanks when fresh water is not being supplied, whereby heat energy is automatically transferred from the lower to the upper tank. The lower tank may advantageously and economically comprise a conventional drum, for example a 55 gallon drum, and all system components are mounted in a cover assembly for the lower tank, so that the upper tank need not be specially fabricated, with the cover assembly also serving to support the upper tank.

19 Claims, 10 Drawing Figures

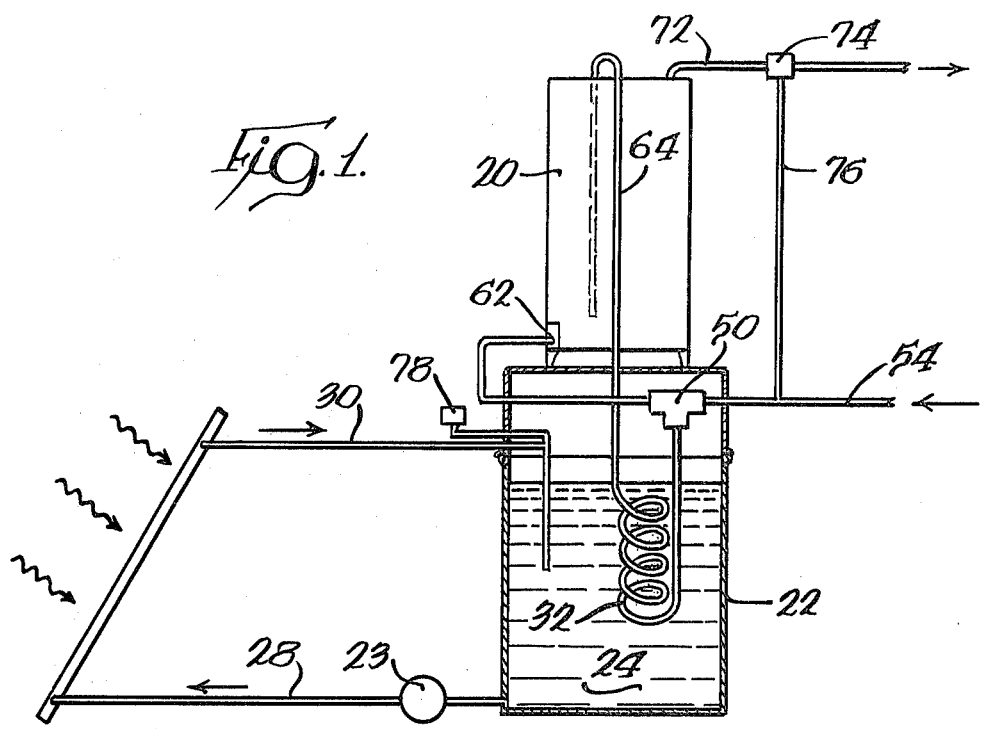
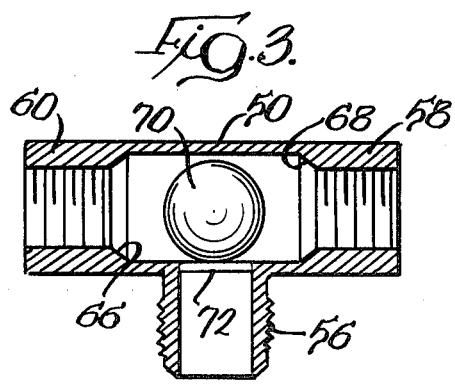
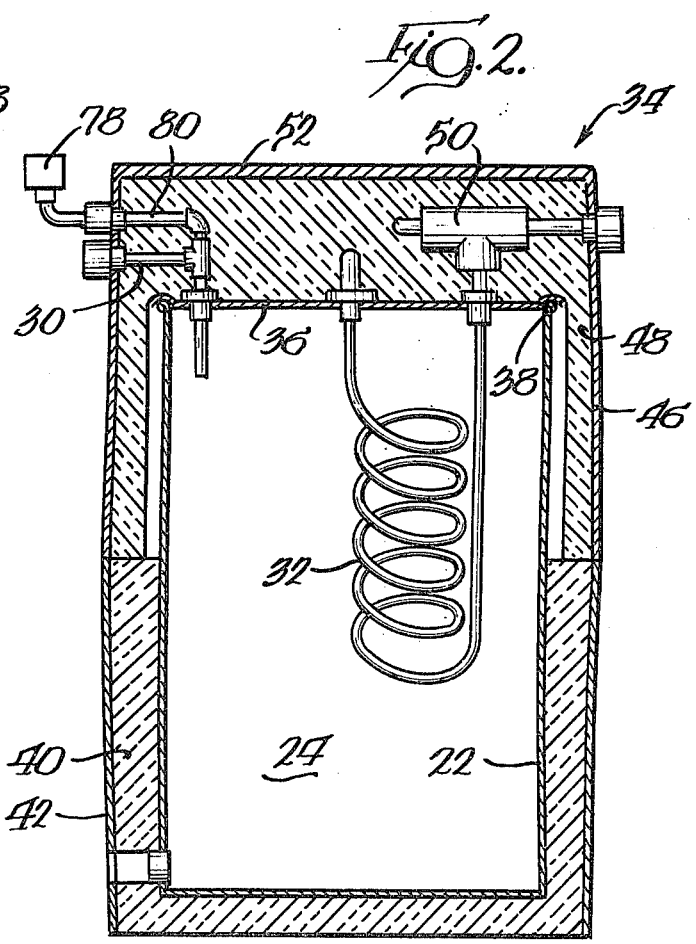
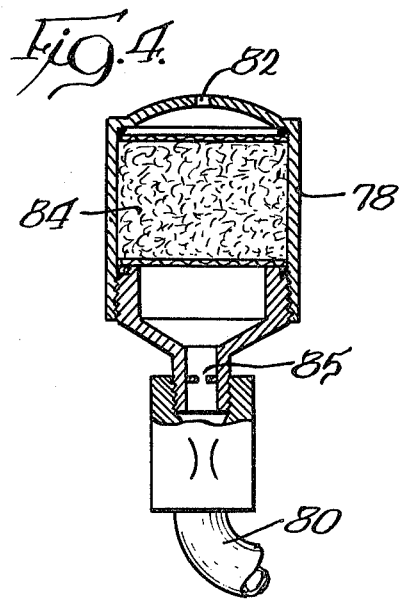

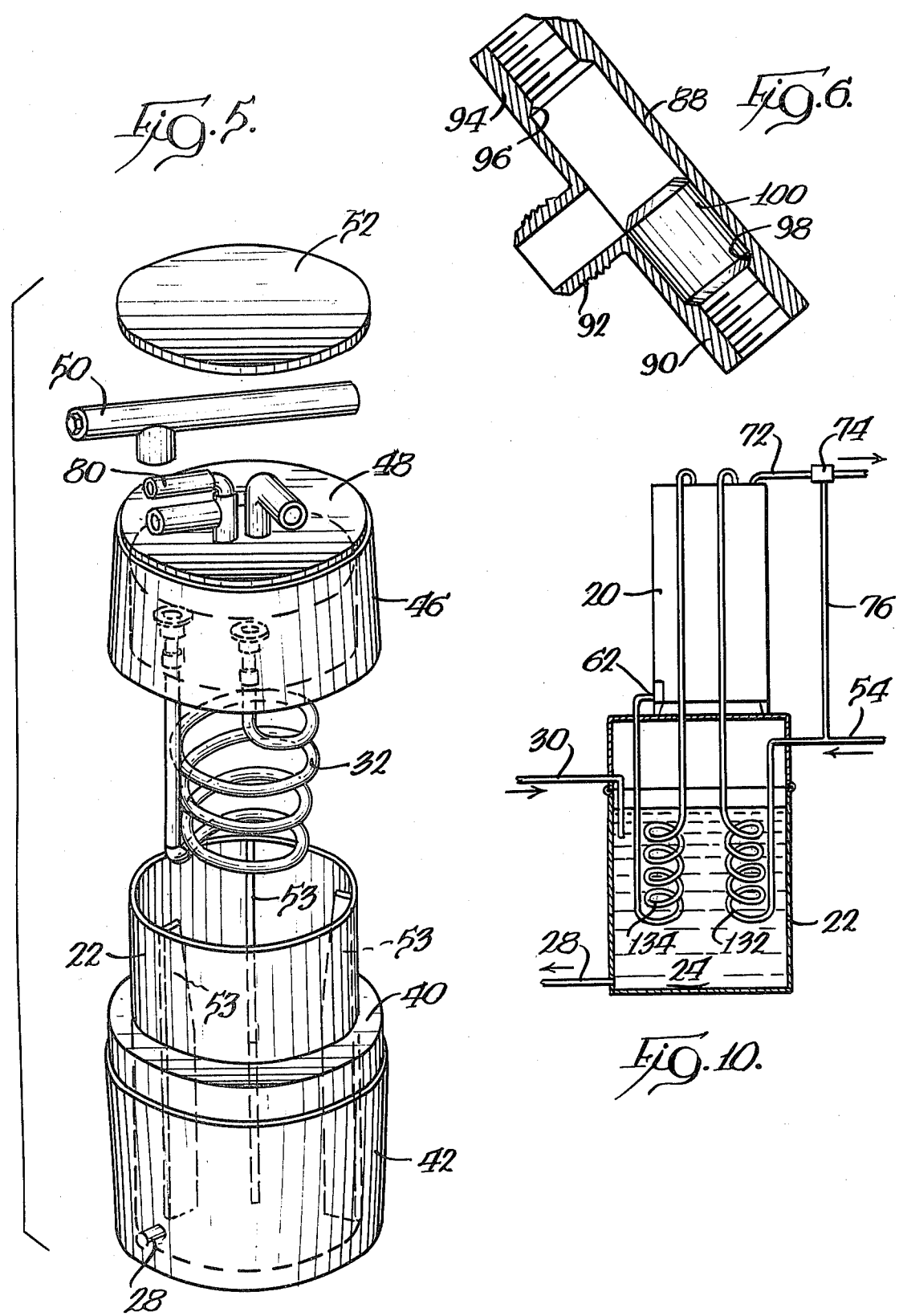

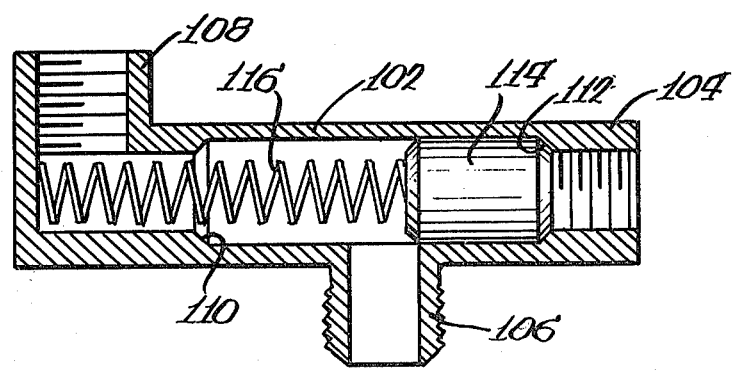
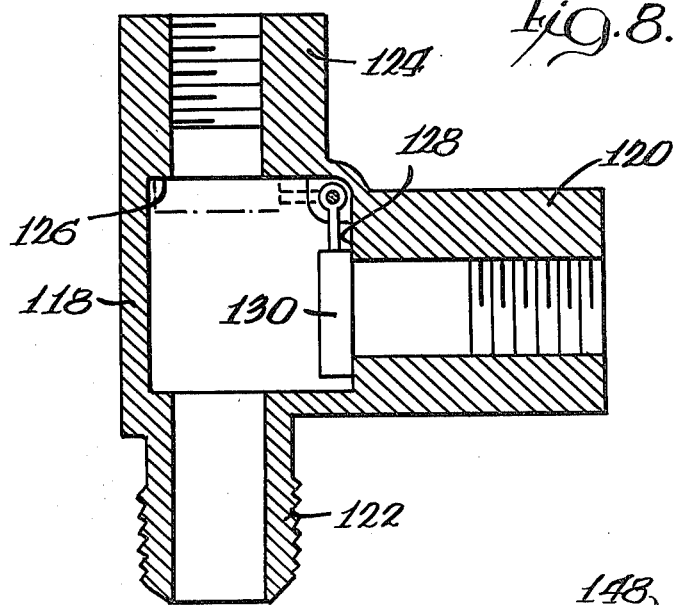
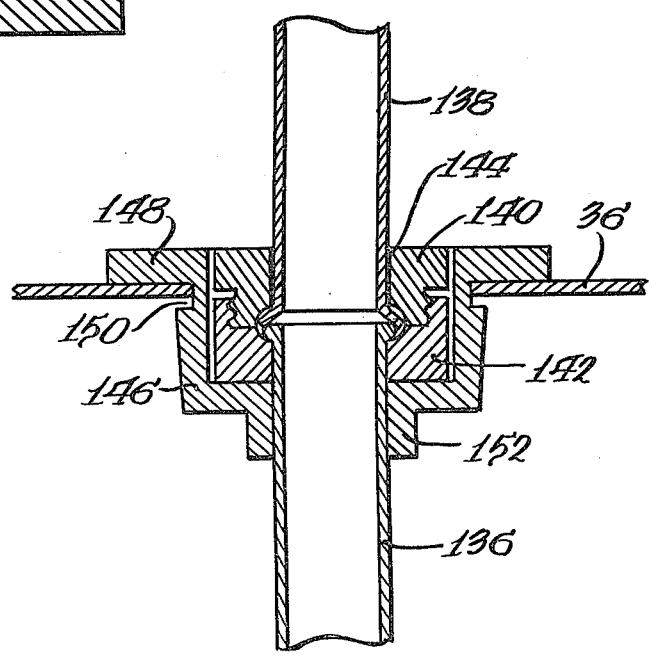

WATER HEATING SYSTEM

BACKGROUND OF THE INVENTION

The present invention relates to water heating systems.

It is known to heat water by using a single storage reservoir or hot water heater which includes both a conventional heating means as well as a heat exchanger connected with an alternate source of heat, such as a solar collector. A disadvantage of such systems is that the water heater must be specially fabricated to accommodate solar energy heating components, which adds considerable expense and complexity to the system. Also, a single tank has a limited energy storage capacity, and since solar energy is irregular and intermittent throughout any day as well as throughout any year, it often happens that stored solar energy is insufficient to meet water heating demands, with the result that increased amounts of utility or conventionally supplied power must be relied upon to heat the water.

The disadvantages of a single tank system may be alleviated somewhat by using two separate tanks or reservoirs set in series. The first has a heat exchanger therein which is connected to a solar collector, and the second may have an electric or gas heater. Cold water enters the first tank wherein it is preheated, and thence passes into the second tank for being additionally heated, if necessary, prior to flowing to a point of delivery. However, a major disadvantage of conventional two tank systems is that there usually is no arrangement, except during extraction of hot water or by mechanical pumping, for transfer of hot water from the first tank to the second, so that if the water in the second tank is not at a sufficient temperature for the needs of the user, it is substantially heated constantly through use of expensive energy supplied by a utility company.

OBJECTS OF THE INVENTION

An object of the present invention is to provide a two tank water heating system, wherein the first tank is a conventional water heater, the second is for storage of heat energy, for example solar energy or waste heat, and a valve is provided for directing incoming cold water through the second tank for preheating prior to introduction into the first tank and for accommodating a thermal siphon effect between the two tanks when fresh water is not being supplied.

Another object of the invention is to provide such a water heating system wherein all system components are in a cover assembly for the second tank, with the first tank being supported on the cover.

SUMMARY OF THE INVENTION

In accordance with the present invention, an apparatus for heating water comprises a first tank having an inlet, an outlet and a drain, and a second tank for containing a supply of heat transfer fluid, said second tank being disposed below said first tank. Also included are means for connecting the heat transfer fluid in said second tank with a source of heat energy for heating the fluid, a heat exchanger disposed in said second tank, said heat exchanger having an inlet and an outlet and said outlet being connected to said first tank inlet, and valve means having a first inlet for connection with a supply of fresh water, a second inlet connected with said first tank drain and an outlet connected with said heat exchanger inlet. Said valve means is responsive to withdrawal of water from said first tank outlet to interrupt a path between its second inlet and its outlet and to establish a path between its first inlet and its outlet for a flow of water from the supply thereof through said valve means and heat exchanger to said first tank inet, said heat exchanger heating the water prior to its introduction into said first tank. Said valve means is also responsive, in the absence of withdrawal of water from said first tank outlet and to a sufficient temperature of the heat transfer fluid in said second tank, to interrupt a path between its second inlet and its outlet for recirculation of water by thermal syphon effect from said first tank drain through said valve means and heat exchanger to said first tank inlet to heat the water in said first tank.

In accordance with another embodiment of the invention, an apparatus for heating water comprises a first tank having an inlet, an outlet and a drain, and a second tank for containing a supply of heat transfer fluid, said second tank being disposed below said first tank. Also included are means for connecting the heat transfer fluid in said second tank with a source of heat energy for heating the fluid; first and second heat exchangers disposed in said second tank, each said heat exchanger having an inlet and an outlet; means for connecting said first heat exchanger inlet with a supply of fresh water and said first heat exchanger outlet with said first tank inlet, whereupon by withdrawal of water from said first tank outlet, incoming fresh water passes through said first heat exchanger for being heated prior to introduction into said first tank inlet; and means for connecting said second heat exchanger inlet to said first tank drain and said second heat exchanger outlet with said first tank inlet for recirculation of water by thermal syphon effect from said first tank drain, through said second heat exchanger and to said first tank inlet to heat the water in said first tank whenever the temperature of the heat transfer fluid in said second tank is greater than the temperature of water in the lower part of said first tank.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1 is a side elevation view, partly in cross section, illustrating a two tank solar energy water heating system in accordance with the teachings of one embodiment of the invention;

FIG. 2 is a side elevation view, partly in cross section, of a lower solar energy storage tank of the system, illustrating a cover for the tank which contains all the system components, thermally insulates the lower tank and provides a support for the upper tank;

FIG. 3 is a cross sectional view of a valve particularly adapted for use with the system, which causes incoming cold water to enter a heat exchanger in the lower tank for being heated prior to introduction into the upper tank, while accommodating a thermal syphon effect between the two tanks when fresh water is not being supplied;

FIG. 4 is a cross sectional view of a vent or breather for the solar energy collector loop;

FIG. 5 is an exploded, perspective assembly view of some of the components of the solar heating portion of the system;

FIGS. 6-8 are cross sectional views of alternate embodiments of valves for use with the system;

FIG. 9 is a cross sectional view of an embodiment of pipe coupling which is particularly suitable for use in the system, and FIG. 10 is an alternate embodiment of solar energy water heating system in accordance with the teachings of the invention.

DETAILED DESCRIPTION

Referring to FIGS. 1 and 2, an upper tank 20, which as shown comprises a conventional water heater tank with a burner or resistance heater unit (not shown) therein, but may comprise a water storage tank connected at an outlet therefrom with an instantaneous type water heater, is mounted on top of or above a solar energy storage tank 22 which contains and through which is circulated, by a small circulating pump 23, a "solar fluid" heated in remotely located solar energy collecting panels 26. A solar fluid return line 28 extends between a lower end of the tank 22 and one side of the solar panels and a solar fluid supply line 30 extends between an opposite side of the panels and a point in the tank below the solar fluid line. Upon operation of the pump, relatively cool solar fluid at the bottom of the tank 22 is caused to flow through the solar panels for being heated and then returned through the line 30 into the upper portion of the tank. Although not shown in the drawings, in use of the invention the solar panels 26 would be at an elevation above that of the energy storage tank 22.

The solar energy storage tank 22 is characterized in that a helical heat exchanger coil 32 therein and all of the piping, valves, etc. (except the solar fluid return line) are carried by and/or embodied in a tank cover assembly, indicated generally at 34. Consequently, a conventional drum, such as a 55 gallon drum, having a cover 36 which mounts on an upper lip 38 of the drum, can economically be used as the storage tank instead of having to fabricate a tank specially for the purpose. The drum may be lined with any suitable corrosion resistant coating and the exterior thereof is covered with a thermal insulating foam 40 or the like contained within an outer shell 42, up to the level where the layer of foam will meet with similar foam insulation on the cover assembly 34. The bung hole conventionally provided adjacent the lower end of the drum serves as the connector for the solar fluid return line 28.

With reference also to FIG. 5, the cover assembly 34 comprises an outer generally cylindrical shell 46, an interior molded insulation foam unit 48 which, with the shell, is designed to receive the lid or cover 36 for the drum 22 and the necessary piping, fittings and a thermal syphon control valve 50, and a top or scuff plate 52 overlying the shell and foam unit for supporting the hot water heater tank 20. The arrangement is such that all connections to the solar storage tank 22, except the solar fluid return line, are effected through the side wall of the shell. The heat exchanger 32 is mounted on and depends from the drum lid into the solar fluid 24 in the drum and rests on three support legs in the drum. As is seen in FIG. 5, the helical heat exchanger is provided with a taper, such that the size of the coils progressively increases from bottom to top. This improves the efficiency of the heat exchanger, since solar fluid cooled upon contact with the upper coils then falls to the bottom of the tank without flowing directly over underlying coils, whereby the transfer of heat energy to the coils is increased. Connectors (bushings) utilized incorporate safety seals so that any leaks, other than a ruptured coil, will take place exteriorly of the drum, so that the water and the solar fluid cannot be intermixed.

Water to be heated is supplied to the system from a supply thereof, such as a city water main, via a water inlet 54 and the thermal syphon control valve 50 which is illustrated in FIG. 3. The valve comprises a "T" body, of which a vertical leg 56 is connected to the inlet to the heat exchanger 32, one horizontal leg 58 is connected to the cold water supply and the remaining horizontal leg 60 is connected to a drain coupling 62 on the hot water heater 20. The outlet from the heat exchanger is connected through a line 64 to a cold water inlet to the hot water heater. Confined within and between the horizontal legs of the "T" valve, and between a valve seat 66 formed with the leg 60 and a valve seat 68 formed with the leg 58, is a ball valve 70 which is preferably neutrally buoyant. A web 72 extending across the passage through the leg 56 prevents entry of the ball valve into the passage, yet is of sufficiently small size so as not to restrict a flow of water through the passage.

The hot water outlet from the water heater 20 is connected with a point of delivery through a line 72, and upon demand for hot water the pressure in the hot water heater tank drops slightly, which is sensed at the valve 50 and causes the ball 70 to be sucked toward and also impelled by the pressure of the water supply toward and into engagement with the valve seat 66. Consequently, incoming water from the water supply must enter the heat exchanger 32 in the solar energy storage tank 22 for preheating and cannot bypass the solar heat exchange provided by the heated solar fluid 24. The incoming water thus enters the heat exchanger coil and forces the previously heated hot water in the upper portion of the coil upwardly to the inlet to the water heater 20 to replace the hot water withdrawn therefrom. When the demand for hot water ceases, the pressure in the system becomes equalized with the pressure of the supply. Should the water delivered by the system be excessively heated by solar energy, a thermal mixing valve 74 in the line 72 is connected with the cold water supply line 54 through a line 76, and enables the temperature to be reduced by intermixing cold water with the hot.

When there is no demand for hot water, a thermal syphon effect comes into play. As the water in the upper tank 20 starts to cool, the cooler water descends to the bottom of the tank. At the same time, the water in the heat exchanger coil 32 in the solar energy storage tank 22 is being heated by the solar fluid 24 and therefore wants to rise. This imbalance causes the ball 70 of the valve 50 to be unseated from the seat 66 and move to the seat 68, whereupon a thermal water circulation is set up between the two tanks, the cooler water from the upper tank exiting through the drain 62 thereof and descending into the leg 60 of the valve 50 and thence to the inlet to the heat exchanger coil, and the hotter water in the coil ascending into the upper tank through the line 64. Thus, the water in the upper tank is heated and automatically kept hot solely by solar energy so long as the solar energy input to the lower tank is adequate.

When the solar energy becomes inadequate and the temperature in the upper tank 20 falls below a preset level, e.g., 140° as determined by thermostat setting, the heater unit in the upper tank turns on to maintain the preset temperature. The thermal syphon effect then stops, because the hotter water is in the upper tank, not the lower tank 22, and power from the public utility is used in an entirely conventional manner to keep the water in the upper tank hot. However, even in this mode at least some preheating of incoming water is still effected by passing it through the heat exchanger coil 32 before introduction into the upper tank.

It should be noted that when thermal syphon is in effect, the ball 70 of the valve 50 is moved against the valve seat 68, and thus provides a thermal barrier between the water heating system and the water supply. Also, should the water supply fail or suffer a loss of pressure, the ball moves against the valve seat 68 and serves as a check valve preventing loss of water from the system and also isolating the system from any harm due to negative pressure forces in the supply. This also prevents any possibility of solar fluid being sucked into the supply.

To permit the solar fluid system to "breath," thereby to permit the solar collector panels to drain when they are not in use to prevent scaling of the collectors and boiling or freezing of the solar fluid 24, and to fill when they are called upon to supply energy, a solar loop air vent is provided. With reference to FIGS. 2 and 4, an air vent 78 connects with the solar fluid supply line 30 by means of a pipe 80, and comprises a generally cylindrical housing vented to atmosphere by a passage 82 and containing a cylindrical foam or sponge-like air filter 84 and a small orifice 85 to restrict any flow of solar fluid through the vent. The solar fluid in the drum 22 is unpressurized, as if the fluid in the collector panels 26 (except for a minimal pressure that may result from operation of the circulating pump), whereby the vent permits excess gases to exit from the solar panel heating system when in use and allows air to enter the system upon draining of the solar fluid in the panels into the tank, with the filter 84 filtering incoming air. Placing the air vent at this point in the solar loop allows the solar fluid to "syphon flow" between the supply and return lines when the system is drained, thereby obviating the need to use the pump 23 for draining purposes.

One alternate embodiment of thermal syphon control valve is shown in FIG. 6, and comprises a "T" body 88 having a leg 90 for connection with the water supply, a leg 92 for connecting with the inlet to the heat exchanger coil 32 and a leg 94 for connecting with the drain coupling 62 of the water heater 20. Valve seats 96 and 98 are formed at inner ends of the legs 94 and 90, respectively, and in this case the valve member is a piston 100 which is heavier than water. The body of the valve is mounted at an incline, so that the piston is gravity biased toward the seat 98 to close off the water supply inlet. Thus, the water supply inlet is open only upon occurrence of a predetermined pressure differential between the water heating system and the supply, or upon a demand for hot water, and upon such demand the piston is moved against the valve seat 96, so that incoming water from the supply must enter the heat exchanger and cannot bypass the solar heat exchange. In the absence of a demand for hot water the piston 100 is gravity biased against the valve seat 98 to close and isolate the water supply inlet and to permit a thermal syphon effect to occur between the two tanks 20 and 22 so long as the solar energy input to the lower tank is adequate.

Another embodiment of thermal syphon control valve is shown in FIG. 7, and comprises a body 102 having a leg 104 for connection with the water supply, a leg 106 for connecting with the inlet to the heat exchanger coil 32 and a leg 108 for connecting with the drain coupling 62 of the water heater 20. Valve seats 110 and 112 are formed at inner ends of the legs 108 and 104, respectively, a piston type valve member 114 is in the passage between the valve seats and a spring 116 normally urges the valve member against the seat 112. The valve operates somewhat similarly to the valve in FIG. 6, except that the valve body need not be mounted at an incline since the spring normally urges the valve member against the seat 112. Thus, the water supply inlet is open only upon occurrence of a demand for hot water, and upon such demand the valve member is moved by the water and against the urging of the spring to a position against the valve seat 110, so that incoming water from the supply must enter the heat exchanger and cannot bypass the solar heat exchange. In the absence of a demand for hot water the valve member 114 is moved by the spring against the valve seat 112 to close and isolate the water supply inlet and to permit a thermal syphon effect to occur between the two tanks 20 and 22 so long as the solar energy input to the lower tank is adequate.

A further embodiment of thermal syphon control valve is shown in FIG. 8, and comprises a "T" body 118 having a leg 120 for connection with the water supply, a leg 122 for connecting with the inlet to the heat exchanger coil 32 and a leg 124 for connecting with the drain coupling 62 of the water heater 20. Valve seats 126 and 128 are formed at the inner ends of the legs 124 and 120, respectively, and the valve member is a plate 130 pivotally mounted for movement between the valve seats 126 and 128. The plate may be normally urged by a spring against the seat 128, or in the alternative, and where the plate is heavier than water, the valve body may be mounted with the leg 124 extending upward so that the plate is gravity biased toward the seat 128. Thus, the water supply inlet is open only upon a demand for hot water, and upon such demand the plate is moved against the valve seat 126, as shown in dashed lines, so that incoming water from the supply must enter the heat exchanger and cannot bypass the solar heat exchange. In the absence of a demand for hot water the plate is either spring or gravity biased against the valve seat 128 to close and isolate the water supply inlet and to permit a thermal syphon effect to occur between the two tanks 20 and 22 so long as the solar energy input to the lower tank is adequate.

FIG. 10 illustrates another embodiment of a two tank solar energy water heating system in accordance with the teachings of the invention, wherein like reference numerals have been used to denote like elements. In this system, two heat exchange coils 132 and 134 are used in the lower solar energy storage tank 22, and the valve 50 (or valve 88, 102 or 118) is omitted. The cold water supply line 54 is connected to the inlet to the heat exchange coil 132, the outlet from which is connected to the inlet to the upper hot water heater tank 20, whereby water introduced into the upper tank is preheated by the heat exchanger in the lower tank. To accommodate a thermal syphon effect between the two tanks, the inlet to the heat exchanger coil 134 is connected to the drain coupling 62 of the water heater, and the outlet from the coil to the inlet to the water heater, whereby a thermal syphon effect occurs so long as the solar energy input to the lower tank is adequate. This system is thus not valve reliant, but suffers the disadvantage of requiring two heat exchanger coils.

As previously mentioned, connectors (bushings) for the heat exchanger coil or coils incorporate safety seals so that any leaks, other than a ruptured coil, will take place exteriorly of the drum 22, so that water and solar fluid cannot be intermixed. Referring to FIG. 9, a preferred embodiment of connector is shown joining an inlet or an outlet line 136 of a heat exchanger with a line 138 which may lead, for example, to the thermal siphon control valve or the inlet to or the drain coupling of the water heater tank 20. The upper end of the line 136 is provided with a bead and the lower end of the line 138 is flared for sealing with the bead, and the connector includes a union having an upper portion 140 around the line 138 and a lower portion 142 around the line 136. The upper portion 140 is soldered to the line 138 at 144, and the upper and lower portions are threadably engaged to move the lines tightly together into sealed engagement.

The union is received within, and the lines 136 and 138 extend through, a generally cup-shaped rubber grommet and safety seal 146. The safety seal has an upper, radially outwardly extending flange 148 and an annular recess 150 beneath the flange, whereby the seal may be received within and mount the union and lines 136 and 138 within a circular opening formed through the drum lid 36. The seal also includes a lower longitudinally extending flange 152 around and sealed with the line 136. Thus, should an excessive amount of solar fluid be introduced into the drum 22, such that the fluid flows between the seal and drum lid through the recess 150, the height of the flange 148 would prevent the fluid from flowing to interior of the seal and about the union, but instead the fluid would be constrained to flow across the drum lid and over the sides thereof. Consequently, should a leak develop at the juncture of the lines 136 and 138, there would be no danger of water and solar fluid being intermixed.

The invention thus provides improved two tank solar energy water heating systems. Because one of the tanks may be a conventional 55 gallon drum and the other a conventional water heater, with modification to neither being required, the system is convenient to install and relatively inexpensive in comparison with conventional systems. The use of the "T" valve in the system advantageously causes incoming water to enter the solar energy storage tank for preheating prior to introduction into the water heater, while at the same time accommodates a thermal siphon effect between the tanks when fresh water is not being supplied, whereby the water in the conventional water heater is maintained at an elevated temperature, without need for power from a public utility, for as long as the solar energy in the energy storage tank is adequate. Also, because all system components are mounted in the cover assembly for the lower energy storage tank, the tank need not be specially fabricated.

It is understood, of course, that the teachings of the invention are not limited to the use of solar energy to heat the heat transfer fluid in the tank 22, and that the fluid could just as readily be heated by some other form of "free" energy, such for example as "waste heat". Also, it is not necessary that the upper tank 20 be a conventional water heater of the type described, but instead could comprise a simple water storage tank having an inlet, an outlet and a drain. In such a case the water in the upper tank would be heated, in the manner described, by stored heat energy in the lower tank, and an instantaneous type water heater could be connected with the outlet from the upper tank to further heat the water as required.

While embodiments of the invention have been described in detail, various modifications and other embodiments thereof may be devised by one skilled in the art without departing from the spirit and scope of the invention, as defined in the appended claims.

What is claimed is:

1. Apparatus for heating water, comprising a first tank having an inlet, an outlet and a drain; a second tank for containing a supply of heat transfer fluid, said second tank being disposed below said first tank; means for connecting the heat transfer fluid in said second tank with a source of energy to heat the fluid; a heat exchanger disposed in said second tank, said heat exchanger having an inlet and an outlet and said outlet being connected to said first tank inlet; and valve means having a first inlet for connection with a supply of fresh water, a second inlet connected with said first tank drain and an outlet connected with said heat exchanger inlet, said valve means being responsive to withdrawal of water from said first tank outlet to interrupt a path between its second inlet and its outlet and to establish a path between its first inlet and its outlet for a flow of water from the supply thereof through said valve means and heat exchanger to said first tank inlet, said heat exchanger heating the water prior to its introduction into said first tank, and said valve means being responsive, in the absence of withdrawal of water from said first tank outlet and to a sufficient temperature of the heat transfer fluid in said second tank, to interrupt a path between its first inlet and its outlet and to establish a path between its second inlet and its outlet for recirculation of water by thermal syphon effect from said first tank drain through said valve means and heat exchanger to said first tank inlet to heat the water in said first tank.

2. Apparatus as in claim 1, wherein said first tank is a water heater tank having means for maintaining water therein at at least a selected temperature, said means for connecting the heat transfer fluid in said second tank with a source of energy comprises means for connecting the fluid with a solar energy collector, and said second tank comprises a solar energy storage tank.

3. Apparatus as in claim 2, wherein said water heater tank is mounted on top of said energy storage tank.

4. Apparatus as in claim 2, wherein said water heater tank drain is toward the bottom thereof, whereby in the absence of withdrawal of water from said water heater tank, water recirculates by thermal syphon effect between said tanks whenever the temperature of water toward the bottom of said water heater tank is less than the temperature of the heat transfer fluid in said energy storage tank.

5. Apparatus as in claim 2, wherein said valve means comprises a housing having a chamber therein, said valve means first and second inlets and outlet communicating with said chamber and said inlets having respective first and second valve seats toward said chamber, and a ball valve in said chamber, said ball valve, upon withdrawal of water from said water heater tank outlet, being moved by a flow of water through said first inlet away from said first valve seat and against said second valve seat to interrupt a path between said second inlet and said outlet and to establish a path between said first inlet and said outlet and, in the absence of withdrawal of water and upon a sufficient temperature of the solar fluid, being moved by a flow of water into said second inlet, by thermal syphon effect, away from said second valve seat and against said first valve seat to interrupt a path between said first inlet and said outlet and to establish a path between said second inlet and said outlet, thereby providing a thermal barrier between said apparatus and the water supply and preventing loss of water from said apparatus in the event of failure of the water supply.

6. Apparatus as in claim 5, wherein said valve means housing is T-shaped and has a first horizontal leg defining said first inlet and first valve seat, a second horizontal leg defining said second inlet and said second valve seat and a vertical leg, intermediate said horizontal legs, defining said outlet, and including means for precluding entry of said ball valve into said vertical leg.

7. Apparatus as in claim 5 or 6, wherein said ball valve is lighter than water.

8. Apparatus as in claim 5 or 6, wherein said ball valve is neutrally buoyant.

9. Apparatus as in claim 2, wherein said valve means comprises a T-shaped body having a first leg defining said first inlet and a first valve seat at an inner end thereof, a second leg, opposite from said first leg, defining said second inlet and a second valve seat at an inner end thereof and a third leg, intermediate said first and second legs, defining said valve means outlet, and a valve member slidable in said body between said first and second valve seats, said valve member being heavier than water and said body being mounted to position said first leg lower than said second leg so that said valve member is gravity urged toward said first valve seat, whereby upon withdrawal of water from said water heater tank outlet said valve member is moved by a flow of water through said first inlet away from said first valve seat and against said second valve seat to establish a path between said first inlet and said valve means outlet and to interrupt a path between said second inlet and said outlet, and in the absence of withdrawal of water from said water heater tank outlet said valve member is moved by gravity away from said second valve seat and against said first valve seat to interrupt a path between said first inlet and said outlet and to establish a path between said second inlet and said outlet.

10. Apparatus as in claim 2, wherein said valve means comprises a T-shaped body having a first leg defining said first inlet and a first valve seat at an inner end thereof, a second leg, opposite from said first leg, defining said second inlet and a second valve seat at an inner end thereof and a third leg, intermediate said first and second legs, defining said valve means outlet, a valve member slidable in said body between said first and second valve seats, and means for normally urging said valve member against said first valve seat, whereby upon withdrawal of water from said water heater tank outlet said valve member is moved by a flow of water through said first inlet against said urging means and away from said first valve seat to against said second valve seat to establish a path between said first inlet and said valve means outlet and to interrupt a path between said second inlet and said outlet, and in the absence of withdrawal of water from said water heater tank outlet said valve member is moved by said urging means away from said second valve seat and against said first valve seat to interrupt a path between said first inlet and said outlet and to establish a path between said second inlet and said outlet.

11. Apparatus as in claim 2, wherein said valve means comprises a T-shaped body having a first leg defining said first inlet and a first valve seat at an inner end thereof, a second leg defining said second inlet and a second valve seat at an inner end thereof and a third leg, intermediate said first and second legs, defining said valve means outlet, a valve plate pivotally mounted in said body for movement between said first and second valve seats, and means for normally urging said valve plate against said first valve seat, whereby upon withdrawal of water from said water heater tank outlet said valve plate is pivoted by a flow of water through said first inlet against said urging means and away from said first valve seat to against said second valve seat to establish a path between said first inlet and said valve means outlet and to interrupt a path between said second inlet and said outlet, and in the absence of withdrawal of water from said water heater tank outlet said valve plate is pivoted by said urging means away from said second valve seat and against said first valve seat to interrupt a path between said first inlet and said outlet and to establish a path between said second inlet and said outlet.

12. Apparatus as in claim 11, wherein said means for urging comprises a spring.

13. Apparatus as in claim 11, wherein said valve body is mounted so that said second valve seat is elevated with respect to said first valve seat and said valve plate is heavier than water, whereby gravity normally urges said valve plate toward and against said first valve seat.

14. Apparatus as in claim 2, wherein said energy storage tank comprises a drum and a removable cover for said drum, said heat exchanger and said valve means being mounted on said cover for removal therewith.

15. Apparatus as in claim 14, including connectors on said cover for removal therewith and for connecting said valve means first inlet with the water supply, said valve means second inlet with said water heater tank drain and said heat exchanger outlet with said water heater tank inlet.

16. Apparatus as in claim 14, wherein said cover includes a lid for said drum, and including connectors supported by said lid for connecting said heat exchanger inlet with said valve means outlet and said heat exchanger outlet with said water heater tank inlet.

17. Apparatus as in claim 16, wherein each said connector comprises a union for coupling together a line to said heat exchanger and a line to said water heater inlet or to said valve means outlet, and a generally cup-shaped resilient material seal, said union being received in said seal and said seal having an upper, annular and radially extending flange, an annular recess beneath said flange and a lower longitudinally extending flange around and sealed with said line to said heat exchanger, said seal extending through a circular opening in said lid with said radial flange extending over said lid outwardly of said opening and the edge of said lid around said opening being received in said recess, whereby said seals of said connectors mount said heat exchanger on said lid and, upon any leakage of heat transfer fluid between said seals and said lid, said radial flange of said seals block the fluid from entering to interior of said seals and about said unions, so that there cannot be any intermixing of heat transfer fluid and water.

18. Apparatus as in claim 1 or 2, wherein said heat exchanger is a helically wound tube, said heat exchanger being tapered such that the convolutions thereof progressively increase in size from bottom to top, whereby heat transfer fluid cooled upon contact with the upper convolutions does not descend directly onto the lower convolutions and the efficiency of said heat exchanger is increased.

19. Apparatus as in claim 14, wherein said drum has a bung hole toward a lower end thereof for connection with a solar fluid return line to the solar energy collector and said cover has a pipe for connection with a solar fluid supply line from the solar energy collector, said pipe extending below the level of the heat transfer fluid in said drum when said cover is on said drum, and wherein said water heater tank is mounted on top of said cover.

* * * * *